US011153295B2

(12) United States Patent
Ganchev et al.

(10) Patent No.: US 11,153,295 B2
(45) Date of Patent: Oct. 19, 2021

(54) AUTHENTICATION OF PLUGINS IN A VIRTUALIZED COMPUTING ENVIRONMENT

(71) Applicant: VMware, Inc., Palo Alto, CA (US)

(72) Inventors: Tony Ganchev, Sofia (BG); Tihomir Mateev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 239 days.

(21) Appl. No.: 16/554,565

(22) Filed: Aug. 28, 2019

(65) Prior Publication Data

US 2021/0067504 A1 Mar. 4, 2021

(51) Int. Cl.
| H04L 29/06 | (2006.01) |
| G06F 21/44 | (2013.01) |
| G06F 9/445 | (2018.01) |
| G06F 9/455 | (2018.01) |

(52) U.S. Cl.
CPC .......... *H04L 63/0807* (2013.01); *G06F 21/44* (2013.01); *G06F 9/44526* (2013.01); *G06F 9/45541* (2013.01); *G06F 9/45545* (2013.01)

(58) Field of Classification Search
None
See application file for complete search history.

(56) References Cited

U.S. PATENT DOCUMENTS

| 8,200,962 | B1 * | 6/2012 | Boodman | ........... H04L 63/0823 |
| | | | | 713/161 |
| 8,365,291 | B1 * | 1/2013 | Le | ...................... G06F 21/6263 |
| | | | | 726/25 |
| 8,566,901 | B2 * | 10/2013 | Kay | ........................ G06F 21/51 |
| | | | | 726/1 |
| 8,667,487 | B1 * | 3/2014 | Boodman | ............... G06F 21/53 |
| | | | | 717/178 |
| 8,978,106 | B2 * | 3/2015 | Swamy | ................. G06F 21/629 |
| | | | | 726/4 |
| 9,239,817 | B2 * | 1/2016 | Claux | ................. G06F 9/44526 |
| 9,930,095 | B2 * | 3/2018 | Warner | ................. G06F 21/566 |
| 10,541,988 | B2 * | 1/2020 | Kottahachchi | ........ H04L 63/102 |
| 2009/0064309 | A1 * | 3/2009 | Boodaei | ............... H04L 63/168 |
| | | | | 726/12 |

(Continued)

OTHER PUBLICATIONS

Saikat Das, Mohammad Zulkernine, "CLOUBEX: A Cloud-Based Security Analysis Framework for Browser Extensions", High Assurance Systems Engineering (HASE) 2016 IEEE 17th International Symposium on, pp. 268-275, 2016. (Year: 2016).*

(Continued)

*Primary Examiner* — Jeffery L Williams
(74) *Attorney, Agent, or Firm* — Su IP Consulting

(57) ABSTRACT

Plugins are authenticated for purposes of accessing and using application program interfaces (APIs) of a management service of a virtualized computing environment. In an authentication process, each plugin is associated with a session ticket that is unique to the plugin. The session ticket may be in the form of a single-use token that has a finite duration, and which may be used by the plugin to establish a session with the APIs of the management service. Because of the single-use and finite duration constraints of the token, the plugin is unable to use the token for other sessions and other plugins are also unable to use the same token to conduct their own sessions with the management service.

21 Claims, 4 Drawing Sheets

(56) References Cited

U.S. PATENT DOCUMENTS

| | | | | |
|---|---|---|---|---|
| 2014/0317682 | A1* | 10/2014 | Erickson | H04L 63/20 |
| | | | | 726/1 |
| 2016/0344561 | A1* | 11/2016 | Grajek | H04L 63/0823 |
| 2016/0364565 | A1* | 12/2016 | Studen | G06F 21/606 |
| 2017/0359327 | A1* | 12/2017 | Kottahachchi | H04L 63/102 |
| 2019/0215304 | A1* | 7/2019 | Yang | H04L 63/20 |
| 2019/0243970 | A1* | 8/2019 | Vinogradov | G06F 21/554 |
| 2020/0042648 | A1* | 2/2020 | Rao | G06F 8/20 |
| 2020/0358714 | A1* | 11/2020 | Singleton, IV | G06F 9/5077 |
| 2021/0067504 | A1* | 3/2021 | Ganchev | H04L 63/0807 |

OTHER PUBLICATIONS

Anton Barua, Mohammad Zulkernine, Komminist Weldemariam, "Protecting Web Browser Extensions from JavaScript Injection Attacks", Engineering of Complex Computer Systems (ICECCS) 2013 18th International Conference on, pp. 188-197, 2013. (Year: 2013).*

A. Guha, M. Fredrikson, B. Livshits and N. Swamy, "Verified Security for Browser Extensions," 2011 IEEE Symposium on Security and Privacy, 2011, pp. 115-130, doi: 10.1109/SP.2011.36. (Year: 2011).*

Gaurav Varshney, Sumant Bagade, Shreya Sinha, "Malicious browser extensions: A growing threat: A case study on Google Chrome: Ongoing work in progress", Information Networking (ICOIN) 2018 International Conference on, pp. 188-193, 2018. (Year: 2018).*

* cited by examiner

AUTHENTICATION OF PLUGINS IN A VIRTUALIZED COMPUTING ENVIRONMENT

BACKGROUND

Unless otherwise indicated herein, the approaches described in this section are not admitted to be prior art by inclusion in this section.

Virtualization allows the abstraction of hardware resources and the pooling of these resources to support multiple virtual machines. For example, through virtualization, virtual machines with different operating systems may be run on the same physical machine. Each virtual machine is generally provisioned with virtual resources that provide similar functions as the physical hardware of a physical machine, such as central processing unit (CPU), memory, and network resources to run an operating system and different applications.

In a virtualized computing environment, users (such as system administrators) may manage, monitor, and administer various objects (e.g., hosts, virtual machines, storage resources, etc.) using a web client or other client/tool. For example, the web client is generally a browser-based interface that may be used by the users to remotely interact with a management entity in order to manage, monitor, and administer the objects in the virtualized computing environment. For this interaction, the management entity may provide a user interface that is usable through the web client to access and operate software, applications, services, and other resources and functionality of the management entity.

The user interface provided by the management entity, and which is used by the web client, is typically a default or core user interface. In some cases, users may wish to customize the web client to support new functionality that is more specific to the users' applications. This customization may be performed through the use of plugins or other software/code that may be used in conjunction with the core user interface at the management entity. However, providing plugins with unrestricted access to the features and functionality of the core user interface at the management entity can cause problems with respect to resource consumption, security, system stability, and compatibility. For instance, a rogue plugin (including an incompatible or badly written plugin, as well as malicious plugins) could crash or otherwise detrimentally affect application program interfaces (APIs) at the management entity, thereby making the APIs or perhaps the entire management entity inoperable for multiple users.

SUMMARY

According to one aspect, a method is provided to authenticate a plugin to enable the plugin to interact with a management service in a virtualized computing environment. The method includes: obtaining a session identification (ID) that is uniquely associated with the plugin; using, by a plugin server, the session ID to request a session ticket from a management server, for the virtualized computing environment, that provides the management service; obtaining, by the plugin server from the management server, the requested session ticket, wherein the session ticket is uniquely associated with the plugin and has a finite duration; and using, by the plugin server, the session ticket to establish a session between the plugin and the management service, wherein the session is conducted within the finite duration of the session ticket.

According to another aspect, a non-transitory computer-readable medium is provided that has instructions stored thereon, which in response to execution by one or more processors, cause the one or more processors to perform or control performance of operations to authenticate a plugin to enable the plugin to interact with a management service in a virtualized computing environment. The operations include: obtaining a session identification (ID) that is uniquely associated with the plugin; using, by a plugin server, the session ID to request a session ticket from a management server, for the virtualized computing environment, that provides the management service; obtaining, by the plugin server from the management server, the requested session ticket, wherein the session ticket is uniquely associated with the plugin and has a finite duration; and using, by the plugin server, the session ticket to establish a session between the plugin and the management service, wherein the session is conducted within the finite duration of the session ticket.

According to still another aspect, a system is provided that includes: a plugin server, having a plugin resident thereon, usable to authenticate the plugin to enable the plugin to interact with a management service in a virtualized computing environment, wherein the plugin server is configured to: obtain a session identification (ID) that is uniquely associated with the plugin; use the session ID to request a session ticket from a management server, for the virtualized computing environment, that provides the management service; obtain, from the management server, the requested session ticket, wherein the session ticket is uniquely associated with the plugin and has a finite duration; and use the session ticket to establish a session between the plugin and the management service, wherein the session is conducted within the finite duration of the session ticket.

DETAILED DESCRIPTION

Figure 1:
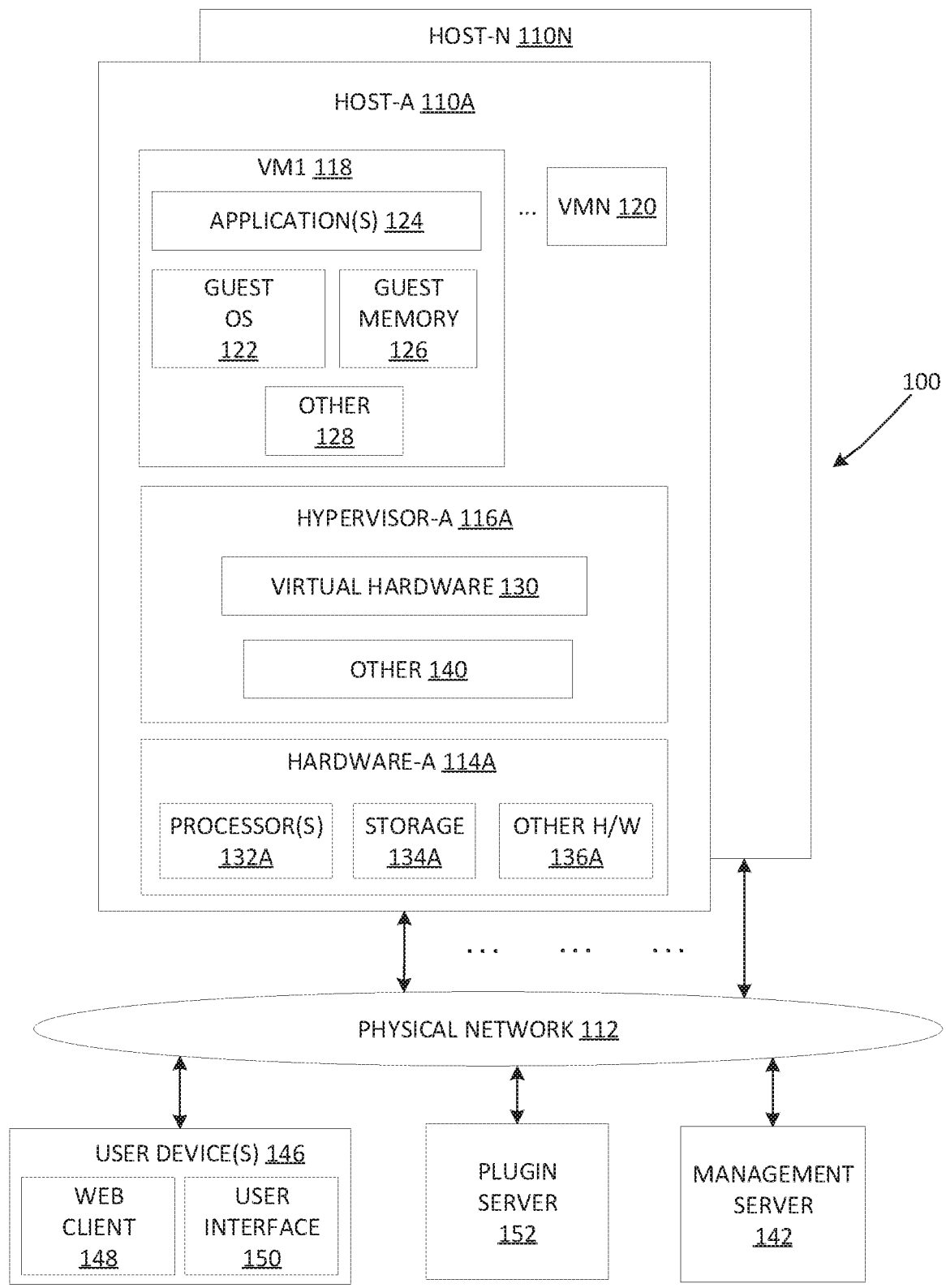
FIG. 1 is a schematic diagram illustrating an example virtualized computing environment in which plugins may be deployed and operated.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks, by providing a technique to authenticate plugins for purposes of accessing and using application program interfaces (APIs) of a management service of a virtualized computing environment. In an authentication process, each plugin is associated with a session ticket that is unique to the plugin. The session ticket may be in the form of a single-use token that has a finite duration, and which may be used by the plugin to establish a session with the APIs of the management service. Because of the single-use and finite duration constraints of the token, the plugin is unable to use the token for other sessions and other plugins are also unable to use the same token to conduct their own sessions with the management service. As a result, the access and use privileges of the plugins can be more effectively and tightly controlled.

Computing Environment

The technology described herein may be implemented in some embodiments in a virtualized computing environment, such as a software-defined datacenter (SDDC). With virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

Various implementations will now be explained in more detail using FIG. 1, which is a schematic diagram illustrating an example virtualized computing environment 100 in which plugins may be deployed and operated. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. The interconnected hosts may in turn form part of a cluster. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include still further other elements, generally depicted at 128, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs. The hypervisor-A 116A may include other elements, generally depicted at 140, such as services, daemons, agents, etc.

Hardware-A 114A in turn includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A management server 142 or other management entity of one embodiment can take the form of a physical computer with functionality to manage or otherwise control the operation of host-A 110A . . . host-N 110N and their corresponding VMs. In some embodiments, the functionality of the management server 142 can be implemented in a virtual appliance, for example in the form of a single-purpose VM that may be run on one of the hosts in a cluster or on a host that is not in the cluster. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100. The management server 142 may be a physical computer or a virtual appliance that provides a management console and other core user interface tools that are directly or remotely accessible to a system administrator or other user. Further details of the elements of the management server 142 will be provided below with respect to FIG. 2.

The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter that is also managed by the management server 142. For the sake of clarity, the management server 142 is depicted in FIG. 1 as a separate standalone physical or virtual machine. In some embodiments, the functionality of the management server 142 may be implemented in any of host-A 110A . . . host-N 110N, instead of being provided as a separate standalone device such as depicted in FIG. 1. There may be a single management server 142 that is provisioned for managing a single cluster of hosts, or a single management server 142 may be provisioned for managing multiple clusters. Moreover, the virtualized computing environment 100 may include multiple management servers 142.

A plugin server 152 may be communicatively coupled to the management server 142 via the physical network 112. As will be described further below with respect to FIG. 2, plugins can reside in the plugin server 152, and such plugins can be registered with the management server 142 and loaded or otherwise invoked by a user device 146 for purposes of extending the functionality of the tools (such as a core user interface) at the management server 142. The plugin server 152 may be a standalone device that is implemented as a physical machine or as a virtual appliance, or implemented at least in part as a hardware element (such as a storage array).

A user may operate the user device 146 to access, via the physical network 112, the functionality of VM1 118 . . . VMN 120, using a web client 148 or other client/tool. For the sake of simplicity of explanation, various embodiments will be described in some contexts hereinafter by referring to the web client 148. However, it is understood that other forms of tools/clients may be used to provide the described features and functionality herein, alternatively or additionally to the web client 148.

The user device 146 can be in the form of a computer, including desktop computers and portable computers (such as laptops and smart phones). In one embodiment, the user may be a system administrator that also uses the web client 148 of the user device 146 to remotely communicate with the management server 142 for purposes of using tools (such as a core user interface) at the management server 142 for performing operations such as configuring, provisioning, managing, monitoring, remediating faults, etc. for the VMs and hosts.

The user device 146 may also include a user interface 150 for interaction with the management server 142. In some embodiments, the user interface 150 may be provided in whole or in part by or as the client itself (e.g., the web client 148). Accordingly throughout the description below, the user interface 150 and the web client 148 (or other client/tool on the user device 146) may be used interchangeably when explaining various operations and features. The user interface 150 of one embodiment can render or otherwise comprise elements of the core user interface, with extensions or other customization provided by one or more plugins from the plugin server 152.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Plugin Deployment

Figure 2:
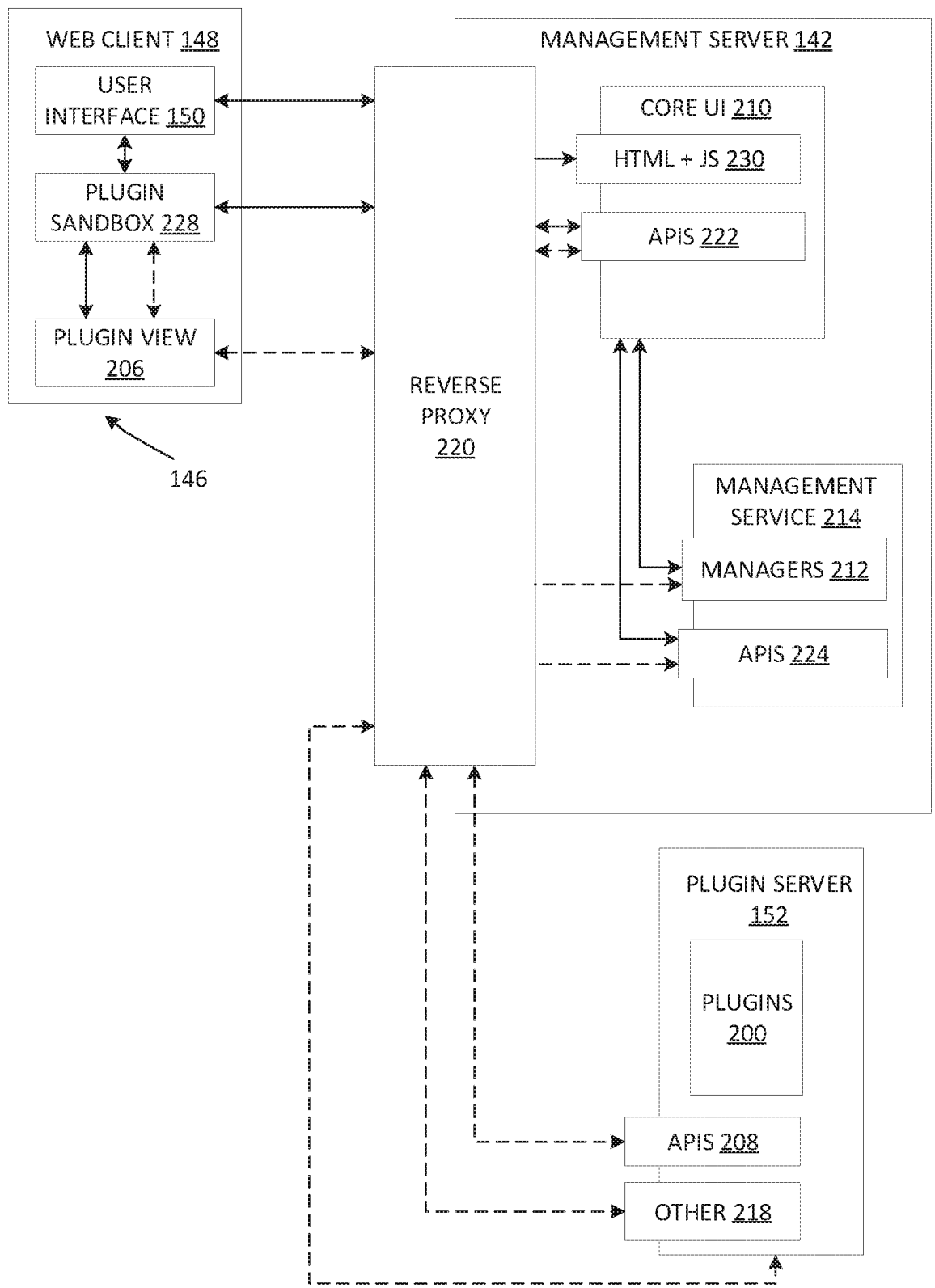
FIG. 2 is a schematic diagram illustrating further details of an example architectural arrangement of a management server, user device, and plugin server for the virtualized computing environment of FIG. 1.

FIG. 2 is a schematic diagram illustrating further details of an example architectural arrangement of the management server 142, the user device 146, and the plugin server 152 for the virtualized computing environment 100 of FIG. 1. In FIG. 2, the solid-line, single-headed and double-headed arrows represent platform operations, while the broken-line, single-headed and double-headed arrows represent plugin operations. For the sake of clarity, the interconnections via the physical network 112 are not depicted in FIG. 2.

With respect to the plugin server 152, the plugin server 152 of one embodiment may be in the form of a single module of a larger application server, which in turn may host additional plugin servers. In some embodiments, an individual plugin server 152 may include one or more remote plugin elements. Such plugin elements may include at least one plugin 200, application program interfaces (APIs) 208 that can be called by the user interface 150 for a plugin view 206, and other elements 218. For the sake of brevity, further details of such other elements 218 are not provided herein.

The plugin 200 of one embodiment may be executed at the plugin server 152, where such execution is triggered or otherwise invoked by the user operating the user interface 150 at the user device 146. In other embodiments, the user interface 150 may load the plugin 200 from the plugin server 152, and execute or otherwise invoke the plugin 200 from the user device 146. There may be multiple plugins 200 in the plugin server 152. The multiple plugins 200 may be different plugins, multiple instances of the same plugin, or different versions of a particular plugin. Such plugin(s) 200 may be served by the plugin server 152 to multiple different user devices 146.

The management server 142 may serve a core user interface 210 that may be extended by the plugin 200. Functionality and features of the core user interface 210 may be accessed via one or more APIs 222. The management server 142 may also include a management service 214, which in turn includes managers 212 and APIs 224. An extension manager is one example of the managers 212 of the management service 214 at the management server 142. As will be explained in further detail below, one of the managers 212 can also include a session manager that is operable to support the authentication of plugins. One example of the APIs 224 is a session management API that interfaces with the session manager.

In operation for one embodiment, the communications between the plugin server 152, and the management server 142 and the web client 148 of the user device 146, may run through a reverse proxy 220. The reverse proxy 220 of one embodiment is an element of the management server 142, and is configured to present a single network address (e.g., on the left side of the reverse proxy 220 in FIG. 2) to the web client 148. Thus, an incoming communication from the web client 148 is directed to the single network address, and then the reverse proxy 220 processes the incoming communication to determine which one or more locations (e.g., on the right side of the reverse proxy 220 in FIG. 2) to route the communication. The communication could be sent to the core user interface 210, to the management service 214, to the plugin server 152, and/or to some other endpoint(s).

For some communications with the management server 142, the plugin server 152 can communicate with one or more APIs 222 of the core user interface 210, so as to execute management-related operations that are initiated from the user interface 150 interacting with the plugin 200. As another example, the plugin server 152 may communicate with the extension manager and any other manager(s) of the managers 212, as well as communicating other instructions/requests to the management service 214 (which may be handled through the APIs 224) for various purposes.

Referring now back to the client device 146 of FIG. 2, the plugin view 206 of one embodiment is served by the plugin server 152, and is configured to communicate with the APIs 208 of the plugin server 152, and with the APIs 222 of the core user interface 210 of the management server 142 and the APIs 224 of the management service 214. The user interface 150 may host or otherwise render the plugin view 206, and may also communicate with the APIs 222 of the core user interface 210 of the management server 142 to perform managerial operations.

According to one embodiment, the web client 148 may further include a plugin sandbox 228. The plugin sandbox 228 is configured to: expose front-end APIs to the plugin view 206, provide session information, and provide isolation between plugins so that one plugin does not affect the behavior of another plugin. For example, a plugin is prevented from stealing a token given to another plugin, or a plugin is prevented from reading data placed in local storage by another plugin since access to a browser's local storage is blocked and a local storage API of the web client 148 is not exposed to the plugin view 206. Further details of the sandbox 228 will be provided later below. With respect to an authentication process for plugins and as will be described further with respect to FIGS. 3 and 4, one embodiment of the plugin sandbox 228 is configured to provide a session identification (ID) to the plugin view 206.

Now referring back to the management server 142 of FIG. 2, the core user interface 210 of one embodiment includes hypertext markup language (HTML) and javascript (JS) 230 of static user interface content/elements that can be rendered by the user interface 150 at the client device 146. The API 222 of one embodiment may also serve as the interface that receives a request for a clone session ticket from the plugin server 152, and that provides the requested clone session ticket from the management service 214 to the plugin server 152, as part of the authentication process for a plugin.

Plugin Authentication

Authentication of plugins will now be described in further detail with respect to FIGS. 3-4. Initially and generally speaking, authentication of plugins may be useful in that the operation of individual plugins can be more closely controlled, for instance for security purposes. For example, in a situation where plugin authentication is not implemented, an authorized (or unauthorized) user may be able to successfully connect to the management server 142, and so the user may be able to invoke any individual plugin or multiple plugins that would have unauthorized/unauthenticated access to the management server 142. Furthermore, such plugin(s) may in turn have the same full access rights and privileges as the user in connection with operating the management server 142. This is not an ideal situation, since any individual plugin should not have unauthenticated/unauthorized access to the management server 142 and should not have the same full access rights and privileges as the user (e.g., any individual plugin should only be able to access and use features of the management service 214 that are compatible with that plugin and that are permitted for that plugin). Providing a plugin with unfettered access to APIs and the full suite of services provided by the management server 142 (including the management service 214) creates the potential for security breakdowns, system instability, etc. Thus in some embodiments, if a user (authorized or unauthorized) can successfully open a plugin and if the plugin does not have any way to obtain authentication information from anywhere, then the plugin cannot invoke privileged operations on the management server 142.

Accordingly, a plugin authentication process may be provided in one embodiment for purposes of controlling a plugin's ability to access APIs 224 to the management service 214. The plugin, if authenticated, is granted a clone session ticket to enable the plugin to open and conduct a session with the management service 214. The ticket remains valid for a single session for that plugin and then expires, and this single-use constraint prevents the plugin from using the ticket for other sessions and also prevents other plugins from using that same ticket to conduct unauthorized sessions (e.g., the other plugins are prevented from impersonating a particular plugin, since the other plugins would need to be themselves authenticated and then receive their own respective unexpired tickets in order to conduct their own sessions).

Figure 3:
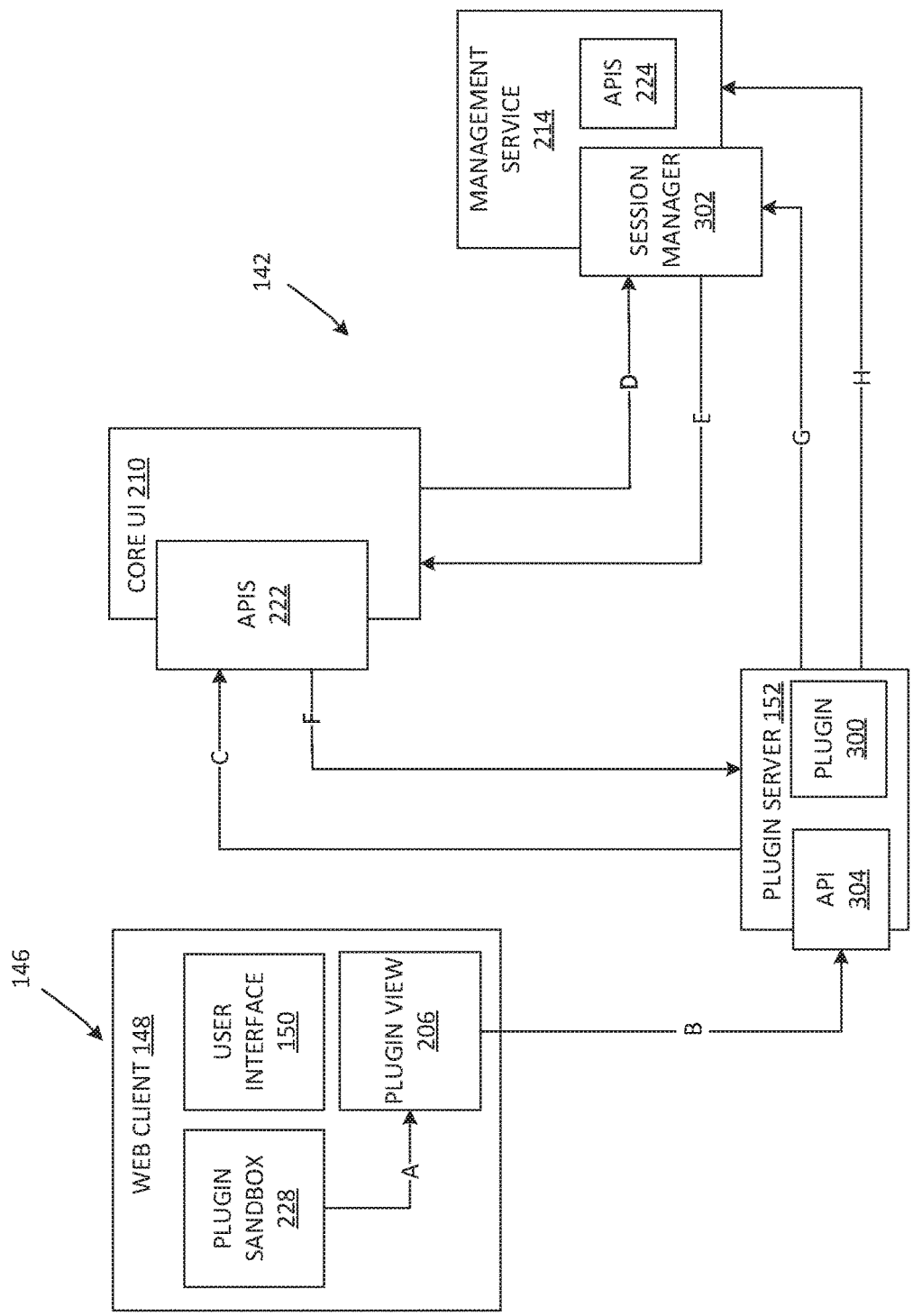
FIG. 3 is a schematic diagram illustrating an example of plugin authentication for the virtualized computing environment of FIG. 1.

FIG. 3 is a schematic diagram illustrating an example of plugin authentication for the virtualized computing environment 100 of FIG. 1. More particularly, FIG. 3 shows at least some of the elements of the user device 146, the management server 142 (which includes the core user interface 210 and the management service 214), and the plugin server 152 from FIG. 2 that may participate in the plugin authentication process and the subsequent session. The arrows labeled A-H represent the flow of communications between the various elements during the plugin authentication process, and are described in further detail in conjunction with FIG. 4. For purposes of clarity, the reverse proxy 220 that is implemented in some embodiments is not explicitly shown in FIG. 3.

As previously explained above, the user interface 150 (at the user device 146) may be used to perform management operations, by rendering elements of the core user interface 210 residing at the management server 142. The user device 146 loads user interface elements of the core user interface 210 into the user interface 150, by communicating with the API 222 to obtain user interface elements to be rendered, to make API calls, etc.

With respect to elements of the plugin view 206 that are to be rendered/operated in the user interface 150, such elements of the plugin view 206 may be obtained from a corresponding plugin 300 (which may be one of the plugins 200 in FIG. 2) that resides in the plugin server 152. The plugin sandbox 228 brokers communications between the user interface 150 and the plugin view 206. According to various embodiments, a dedicated plugin sandbox 228 may be provided for each plugin and/or for each plugin view 206. As such, there may be multiple plugin sandboxes 228 and plugin views 206, each corresponding to multiple plugins 200 at the plugin server 152. There may also be multiple instantiations of the plugin server 152 and the management service 214.

In operation, the user operating the web client 148 may wish to invoke (via the user interface 150 and the plugin view 206) the plugin 300 in order to access the APIs 224 of the management service 214, for purposes of performing managerial tasks. In order to enable to plugin 300 to access one or more of the APIs 224 to perform such tasks, the plugin 300 proceeds through an authentication process, which will be described next with respect to FIG. 4, in order to ensure that the plugin 300 is authorized to access the resource(s) and to perform the task(s) that the user is intending to perform with the plugin 300.

Figure 4:
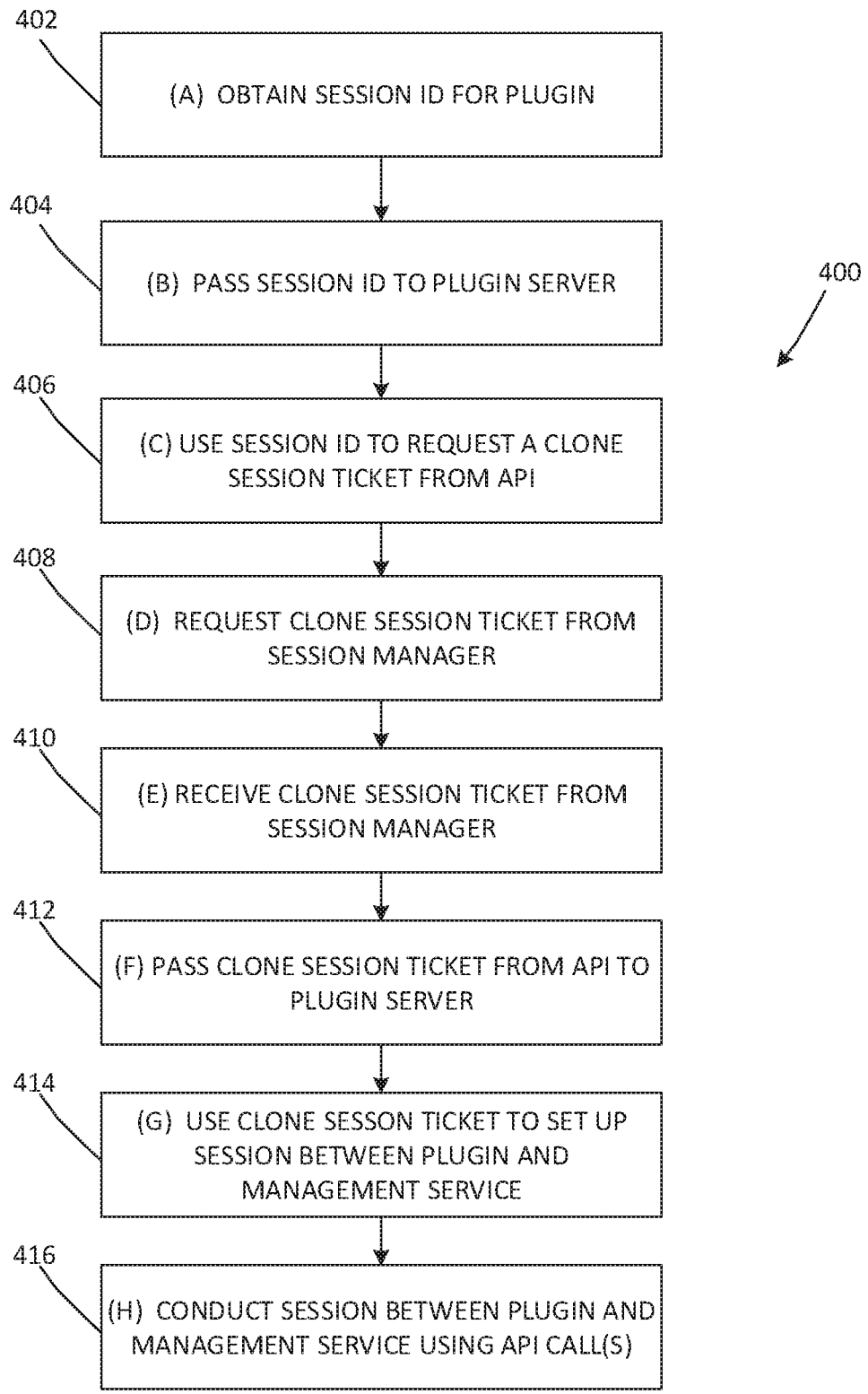
FIG. 4 is a flowchart of an example method to authenticate plugins in the virtualized computing environment of FIG. 1.

Specifically, FIG. 4 is a flowchart of an example method 400 depicting operations that are performed by one or more of the elements shown in FIG. 3. The method 400 for plugin authentication can be implemented in the virtualized computing environment 100 in one embodiment. In another embodiment, the method 400 can be implemented in some other type of computing environment (which may not necessarily involve a virtualized computing environment), wherein it would be beneficial to authenticate plugins. The example method 400 may include one or more operations, functions, or actions illustrated by one or more blocks, such as blocks 402 to 416. The various blocks of the method 400 and/or of any other process(es) described herein may be combined into fewer blocks, divided into additional blocks, supplemented with further blocks, and/or eliminated based upon the desired implementation.

The method 400 of FIG. 4 can be explained herein with reference to the elements shown in FIG. 3. Specifically, the communications A-H shown in FIG. 3 are correspondingly labeled and described with respect to operations at blocks 402-416 in FIG. 4. In one embodiment, the operations of the method 400 may be performed in a pipelined sequential manner. In other embodiments, some operations may be performed out-of-order, in parallel, etc.

The method 400 may begin at a block 402 ("OBTAIN SESSION ID FOR PLUGIN"), wherein the plugin sandbox 228 provides a session ID to the plugin view 206 that is presenting/invoking the plugin 300. The session ID may be in the form of a token or other piece of information that is uniquely associated (a) with the plugin 300 and (b) with a session that the plugin 300 intends to conduct with one or more APIs 224 of the management service 214 that are exposed by the API 222. The session ID associated with each plugin may be different from one plugin to another, and from one session to another.

In one embodiment, the plugin sandbox 228 and/or some other element of the web client 148 obtains the session ID from the API 222. For instance, the management service 214 may include a session manager 302 (which may be one of the managers 212 shown in FIG. 2) that generates the session ID and associates the session ID with the plugin 300 by verifying that the plugin 300 is registered with the extension manager (including verifying which of the APIs 224 that the plugin 300 is permitted to access). The session manager 302 passes the session ID to the API 222, which then passes the session ID to the plugin sandbox 228, so that the plugin sandbox 228 can provide the session ID to the plugin view 206.

Next at a block 404 ("PASS SESSION ID TO PLUGIN SERVER"), the plugin view 206 passes the session ID to the plugin server 152. The communication of the session ID to the plugin server 152 may be in the form of a call to an API 304 at the plugin server 152. In one embodiment, a uniform resource locator (URL) or other identification of the API 222/management server 142 is also provided to the plugin server 152, in addition to the session ID, so that the plugin server 152 will know which instance of the API 222/management server 142 that the plugin view 206 (the plugin 300) is communicating with.

At a block 406 ("USE SESSION ID TO REQUEST A CLONE SESSION TICKET FROM API"), the plugin server 152 uses the session ID to generate a request, sent to the API 222, for a clone session ticket. In one embodiment, the request is in the form of a GET request.

The clone session ticket according to various embodiments may be in the form of a token having a single-use constraint and which is uniquely associated with the plugin 300 (e.g., each plugin that goes through the authentication process will have a different token assigned to it). The token can be valid/active for a finite duration and will expire at the end of the finite duration. The valid/active duration of the token can be configured in several ways. In one example, the duration of the token can be time-based (e.g., the token may be valid for 1 hour or other time duration). In another example, the duration of the token can be configured in terms of the number of API calls permitted to be made by the plugin during a session (e.g., the token will expire after 1 API call, 15 API calls, 36 API calls, or other pre-defined number of API calls). In still another example, the duration of the token can correspond to the duration of the session conducted by the plugin 300—thus, so long as the plugin 300 is actively engaged in the session (e.g., the session has not been closed by the user or the session has not timed out), the token remains active.

There are several benefits and purposes for implementing a single-use token. A general problem of just passing around a session ID is that if the session ID leaks, any user that obtains the session ID may be able to pass the session ID to the management service 214 to perform authorized operations on behalf of the user who's session ID just leaked. The single-use, clone session ticket is a safer implementation because in all probability, the plugin 300 for which the ticket was intended will be the first to use the ticket, and any subsequent attempt by a malicious party to reuse the same ticket will fail. Even in a case when the malicious party gets to use the ticket first, the plugin 300 can detect and report this when its own attempt to clone the original session fails. Thus, the single-use, expiring ticket limits the chances for any attacker to be able to establish an authenticated session with the management service 214 and makes it difficult/impossible for the attacker to parasite on an established session.

At a block 408 ("REQUEST CLONE SESSION TICKET FROM SESSION MANAGER"), the API 222, having received the request for the clone session ticket from the plugin server 152, passes the request to the session manager 302. The session manager 302 then generates/configures the clone session ticket as described above, in terms of duration and uniquely associating the clone session ticket to the plugin 300.

At a block 410 ("RECEIVE CLONE SESSION TICKET FROM SESSION MANAGER"), the API 222 receives the clone session ticket from the session manager 302. At a block 412 ("PASS CLONE SESSION TICKET FROM API TO PLUGIN SERVER"), the API 222 passes the clone session ticket to the plugin server 152.

At a block 414 ("USE CLONE SESSION TICKET TO SET UP SESSION BETWEEN PLUGIN AND MANAGEMENT SERVICE"), the plugin server 152, having received the clone session ticket from the API 222, communicates the clone session ticket to the session manager 302 in order to set up a session between the plugin 300 and the management service 214.

At a block 416 ("CONDUCT SESSION BETWEEN PLUGIN AND MANAGEMENT SERVICE USING API CALL(S)"), the plugin 300 conducts a session with the management service 214 within the duration of the clone session ticket. The session could involve one or more API calls via the APIs 224 for performing managerial tasks related to the VMs and hosts in the virtualized computing environment 100.

The session performed between the plugin 300 at the plugin server 152 and the APIs 224 of the management service 214 may be a cloned session in the terminology used above, in the sense that a cloned session may be any session created with a copy of the attributes of an existing session. Examples of such attributes may include the logged-in user's name, the identity of the device being used for the session (including the identity of which plugin is using the session), the permissions that are given to the owner of the session (e.g., user and device), etc. In comparison to sharing a session (wherein if multiple clients/devices are sharing a session, the first device that logs out will destroy the session for all other device), the device (in a cloned session implementation) that logs out will end just its own clone of the session.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 4. For example, the plugin server 152 can include a processor coupled to a computer-readable medium having instructions stored thereon, which in response to the execution by the processor, cause the plugin server 152 to perform at least some of the operations of the method 400 of FIG. 4.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to provide authentication for plugins.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to authenticate a plugin to enable the plugin to interact with a management service in a virtualized computing environment, the method comprising:
   obtaining a session identification (ID) that is uniquely associated with the plugin;
   using, by a plugin server, the session ID to request a session ticket from a management server, for the virtualized computing environment, that provides the management service;
   obtaining, by the plugin server from the management server, the requested session ticket, wherein the session ticket is uniquely associated with the plugin and has a finite duration; and
   using, by the plugin server, the session ticket to establish a session between the plugin and the management service, wherein the session is conducted within the finite duration of the session ticket.

2. The method of claim 1, wherein the session includes interactions between the plugin and one or more application program interfaces (APIs) of the management service.

3. The method of claim 1, wherein obtaining the session ID includes obtaining, by the plugin server, the session ID from a user device that received the session ID from the management server.

4. The method of claim 1, wherein the finite duration of the session ticket is configured based on one or more of: a time-based duration, a number of application program interface (API) calls permitted to be made by the plugin during the session, or a duration of the session.

5. The method of claim 1, further comprising obtaining, by the plugin in server, an identification of the management server in addition to the session ID, so as to enable the plugin server to determine which instance of the management server is in communication with the plugin.

6. The method of claim 1, further comprising obtaining, by the plugin server, multiple session IDs and multiple session tickets that are uniquely associated with respective multiple plugins that reside at the plugin server.

7. The method of claim 1, wherein either or both of the session ID and the session ticket comprise tokens.

8. A non-transitory computer-readable medium having instructions stored thereon, which in response to execution by one or more processors, cause the one or more processors to perform or control performance of operations to authenticate a plugin to enable the plugin to interact with a management service in a virtualized computing environment, the operations comprising:
  obtaining a session identification (ID) that is uniquely associated with the plugin;
  using, by a plugin server, the session ID to request a session ticket from a management server, for the virtualized computing environment, that provides the management service;
  obtaining, by the plugin server from the management server, the requested session ticket, wherein the session ticket is uniquely associated with the plugin and has a finite duration; and
  using, by the plugin server, the session ticket to establish a session between the plugin and the management service, wherein the session is conducted within the finite duration of the session ticket.

9. The non-transitory computer-readable medium of claim 8, wherein the session includes interactions between the plugin and one or more application program interfaces (APIs) of the management service.

10. The non-transitory computer-readable medium of claim 8, wherein obtaining the session ID includes obtaining, by the plugin server, the session ID from a user device that received the session ID from the management server.

11. The non-transitory computer-readable medium of claim 8, wherein the finite duration of the session ticket is configured based on one or more of: a time-based duration, a number of application program interface (API) calls permitted to be made by the plugin during the session, or a duration of the session.

12. The non-transitory computer-readable medium of claim 8, wherein the operations further comprise:
  obtaining, by the plugin in server, an identification of the management server in addition to the session ID, so as to enable the plugin server to determine which instance of the management server is in communication with the plugin.

13. The non-transitory computer-readable medium of claim 8, wherein the operations further comprise:
  obtaining, by the plugin server, multiple session IDs and multiple session tickets that are uniquely associated with respective multiple plugins that reside at the plugin server.

14. The non-transitory computer-readable medium of claim 8, wherein either or both of the session ID and the session ticket comprise tokens.

15. A system, comprising:
  a plugin server, having a plugin resident thereon, usable to authenticate the plugin to enable the plugin to interact with a management service in a virtualized computing environment, wherein the plugin server is configured to:
    obtain a session identification (ID) that is uniquely associated with the plugin;
    use the session ID to request a session ticket from a management server, for the virtualized computing environment, that provides the management service;
    obtain, from the management server, the requested session ticket, wherein the session ticket is uniquely associated with the plugin and has a finite duration; and
    use the session ticket to establish a session between the plugin and the management service, wherein the session is conducted within the finite duration of the session ticket.

16. The system of claim 15, wherein the session includes interactions between the plugin and one or more application program interfaces (APIs) of the management service.

17. The system of claim 15, wherein the plugin server is configured to obtain the session ID from a user device that received the session ID from the management server.

18. The system of claim 15, wherein the finite duration of the session ticket is configured based on one or more of: a time-based duration, a number of application program interface (API) calls permitted to be made by the plugin during the session, or a duration of the session.

19. The system of claim 15, wherein the plugin server is further configured to obtain an identification of the management server in addition to the session ID, so as to enable the plugin server to determine which instance of the management server is in communication with the plugin.

20. The system of claim 15, wherein the plugin server is further configured to obtain multiple session IDs and multiple session tickets that are uniquely associated with respective multiple plugins that reside at the plugin server.

21. The system of claim 15, wherein either or both of the session ID and the session ticket comprise tokens.

* * * * *